US009009677B2

(12) United States Patent
Zhao et al.

(10) Patent No.: US 9,009,677 B2
(45) Date of Patent: Apr. 14, 2015

(54) APPLICATION TESTING AND ANALYSIS

(71) Applicant: Microsoft Corporation, Redmond, WA (US)

(72) Inventors: Feng Zhao, Bellevue, WA (US); Niels Brouwers, Delft (NL); Nicholas Donald Atkins Lane, Beijing (CN); Chieh-Jan Mike Liang, Beijing (CN); Ranveer Chandra, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

(21) Appl. No.: 13/845,449

(22) Filed: Mar. 18, 2013

(65) Prior Publication Data

US 2014/0282425 A1 Sep. 18, 2014

(51) Int. Cl.
G06F 9/44 (2006.01)
G06F 11/36 (2006.01)
G06F 11/34 (2006.01)

(52) U.S. Cl.
CPC ........ G06F 11/3688 (2013.01); G06F 11/3414 (2013.01); G06F 11/3466 (2013.01); G06F 11/3409 (2013.01); G06F 2201/865 (2013.01)

(58) Field of Classification Search
CPC .................................................. G06F 11/3668
See application file for complete search history.

(56) References Cited

U.S. PATENT DOCUMENTS

| 2002/0198684 | A1 | 12/2002 | Gross et al. | |
| 2004/0172601 | A1* | 9/2004 | Rettig et al. | 715/523 |
| 2009/0037881 | A1* | 2/2009 | Christy et al. | 717/124 |
| 2009/0204795 | A1 | 8/2009 | Nasuto et al. | |
| 2009/0307531 | A1* | 12/2009 | Karthikeyan et al. | 714/38 |
| 2010/0003923 | A1* | 1/2010 | McKerlich et al. | 455/67.11 |
| 2010/0131910 | A1* | 5/2010 | Sanghani et al. | 716/6 |
| 2011/0088039 | A1* | 4/2011 | Tabone et al. | 718/104 |
| 2011/0172985 | A1* | 7/2011 | Mangold et al. | 703/21 |
| 2012/0060142 | A1 | 3/2012 | Fliess et al. | |
| 2012/0151041 | A1 | 6/2012 | Gerber et al. | |
| 2013/0024843 | A1 | 1/2013 | Kutlu | |
| 2013/0174128 | A1* | 7/2013 | Kansal et al. | 717/135 |
| 2014/0177459 | A1* | 6/2014 | Watt et al. | 370/252 |

FOREIGN PATENT DOCUMENTS

AU WO2012075526 6/2012

OTHER PUBLICATIONS

"Crests Software Development, Testing and Validation Aiming at Real Target Computers," retrieved on Nov. 23, 2012 at <<http://www.ajt.com.cn/ajt/rttest.htm>>, Autosoft Jitong (CREST/RT-TEST), 1999, 2 pages.

(Continued)

*Primary Examiner* — Philip Wang
(74) *Attorney, Agent, or Firm* — Dan Choi; Judy Yee; Micky Minhas

(57) ABSTRACT

Application testing and analysis may include performing perturbations to affect an environment associated with the application executing on a user device without affecting other applications executing on the user device. The execution of the application may be traced while the perturbations are being performed to determine an amount of resources of the user device consumed by the application and to determine whether a performance of the application was degraded.

20 Claims, 8 Drawing Sheets

(56) References Cited

OTHER PUBLICATIONS

"Functional Tests," retrieved on Nov. 23, 2012 at <<http://www.soapui.org/Data-Driven-Testing/functional-tests.html>>, SmartSear Software, published Jun. 7, 2010, 9 pages.

"Introduction to Data-Driven Testing in TestComplete 9.0," retrieved on Nov. 22, 2012 at <<http://support.smartbear.com/articles/testcomplete/data-driven-testing/>>, 2012, SmartBear Software, 7 pages.

"Testing Mobile Applications," retrieved on Nov. 22, 2012 at <<http://www.tutorialspoint.com/white-papers/335.pdf>>, published by 360/ogica software testing Services (www.360/ogica.com), 2011, 8 pages.

Zhang et al., "Challenges, Methodologies, and Issues in the Usability Testing of Mobile Applications," retrieved on Nov. 22, 2012 at <<http://userpages.umbc.edu/~zhangd/Papers/IJHCI1.pdf>>, International Journal of Human-Computer Interaction, vol. 18, No. 3, 2005, pp. 293-308.

PCT Search Report & Written Opinion for Application No. PCT/US2014/030096, mailed on Jul. 22, 2014, 12 pgs.

* cited by examiner

APPLICATION TESTING AND ANALYSIS

BACKGROUND

Testing applications to provide compatibility across a mobile platform (e.g., hardware configurations) may present challenges to application developers. For example, the mobile platform may be available on multiple types of devices, with each type of device having different amounts of resources, such as memory, processing power, battery power/ energy, and the like. In addition, the devices may be capable of communicating using a variety of network protocols, including older protocols (e.g., 2G and 2.5G) and newer protocols (e.g., 3G protocols, 4G protocols, Wi-Fi, etc.). Thus, to ensure compatibility of an application across multiple devices and multiple network protocols, an application developer may test the application using multiple devices across different types of networks. However, such a testing process may be long and tedious due to the number of devices and network types that the application is to be tested across.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Generally, this application relates to testing and/or analysis of applications. Some implementations provide techniques and arrangements to perform perturbations to affect an environment of an application executing on a user device without affecting other applications executing on the user device. The execution of the application may be monitored while the perturbations are being performed to gather data. The gathered data may be analyzed to determine whether the perturbations caused excessive resource consumption and/or performance degradation.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Per Application Perturbation

Figure 1:
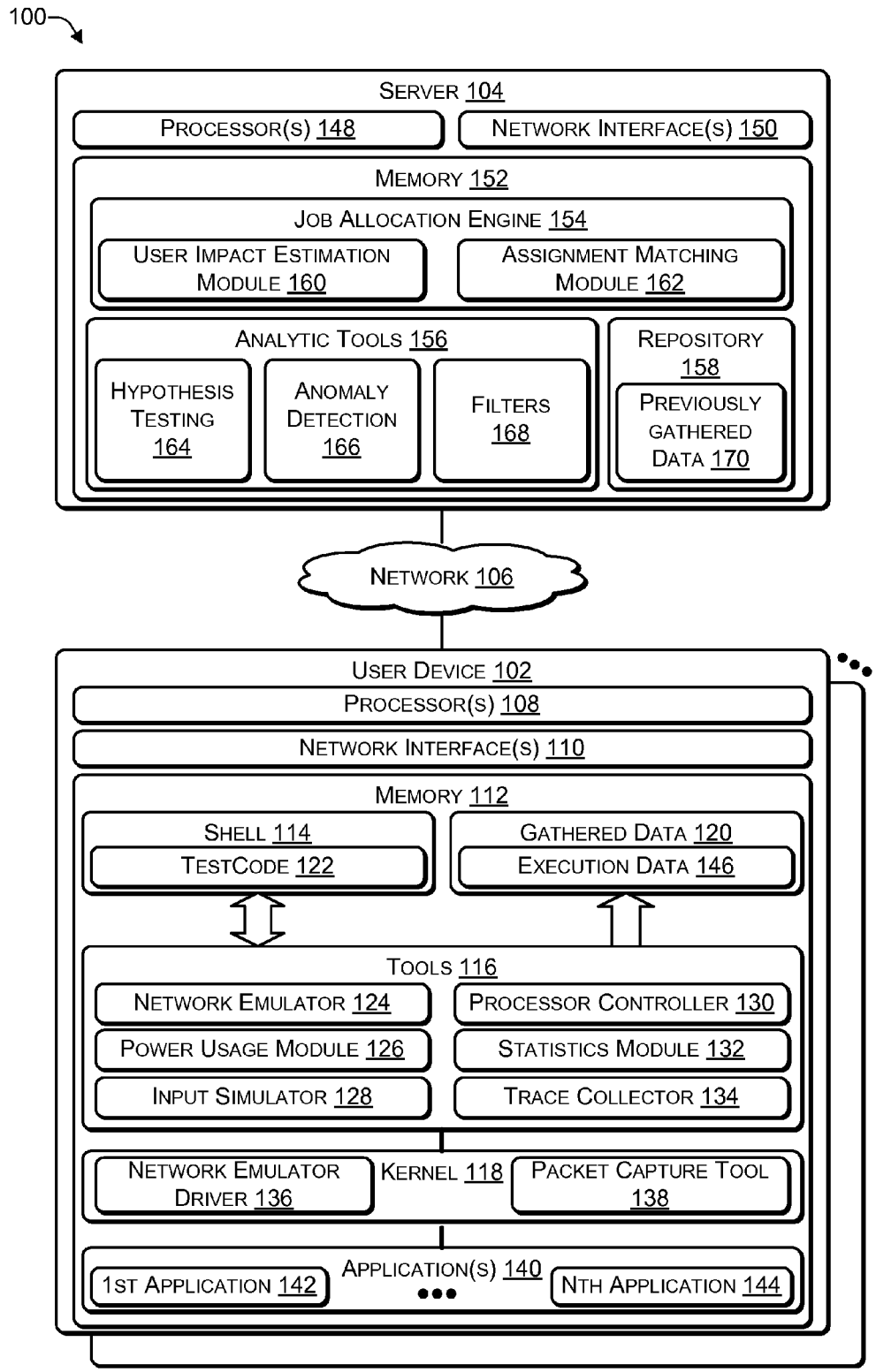
FIG. 1 illustrates an example framework for application testing and analysis according to some implementations.

The technologies described herein generally relate to tools to perform perturbations to affect one or more applications executing on a user device (e.g., a mobile phone or tablet computing device) and tools to monitor and analyze the effect of the perturbations on the applications. The user devices may be actual physical devices, virtual machine emulations, or a combination of both. The term perturbation refers to emulating or simulating, on a user device, different types of conditions that the applications may encounter, such as, for example, limited resources (e.g., memory, processing power, battery power/energy, or the like), backward compatibility with older mobile platforms, backward compatibility with older networks and/or older network protocols, side-effects caused by other applications, unexpected sensor input provided by on-board sensors, other types of environmental or network conditions, or any combination thereof. For example, the perturbations may enable an application developer to test an application on a single user device while emulating different types of user devices, different types of networks, different types of network conditions, different types of user input, different types of sensor input, and/or other types of environmental or network conditions. In addition, the tools may enable perturbations on a per application basis, such that an environment of an application may be perturbed without affecting other applications executing on the user device. Per application perturbation may enable application developers to test applications in a test facility, in live use situations (e.g., users that are using their user devices in a normal manner to place calls, send messages, browse the Internet, etc.), or a combination of both. In one example, the application developer may use commands from a scripting language to create test code that, when executed on a user device, causes perturbations to an application executing on the user device.

A mobile computing platform family may encompass a variety of products (e.g., phone, 7" tablet, 10" tablet, 14" laptop, etc.) across multiple generations of products and/or multiple price points. For example, the mobile computing platform family may include a first model with a single-core processor executing at a clock speed of 2.5 gigahertz (GHz) and having access to 4 gigabytes (GB) of memory, up to a second model with a quad-core processor executing at a clock speed of 3.5 GHz and with access to 32 GB of memory. In addition, the network access capabilities of the various devices in the family may also vary from device to device. For example, the first model may be capable of Enhanced Data rates for Global System for Mobile (GSM) Evolution (EDGE) network access while the second model may be capable of both EDGE and Long Term Evolution (LTE) network access. At least some of the models may be capable of analog roaming in areas where digital service is unavailable. The tools described herein may enable an application developer to execute an application on one type (e.g., model) of a user device while using the tools to simulate how the application may execute on other types of user devices with different capabilities (e.g., different amount of memory, different processor speed, different number of processor cores, or the like).

The tools may enable the application developer to test how the application performs when the user device is communicating on different types of networks (e.g., networks that use different types of protocols) by causing a modem of the user device to emulate different types of networks (e.g., EDGE, LTE, or the like). The tools may enable the application developer to test how the application performs under different types of network conditions, such as reduced reception bandwidth, reduced transmission bandwidth, dropped data (e.g., packets), another type of network condition, or any combination thereof.

The tools may enable the application developer to test how much energy (e.g., battery power) the application consumes to enable the application developer to reduce the application's energy consumption. The tools may enable the application developer to test how the application performs when input is received from the user (e.g., via touchscreen, keypad, microphone, track ball, etc.), from sensors (e.g., GPS unit, accelerometer(s), camera(s), communication connections such as WiFi, Bluetooth, near field communications, etc.), or both.

The tools may enable the application developer to perturb one or more specified applications without affecting other applications executing on the user device. For example, compared to other applications executing on a user device, an application that is being perturbed may experience a different operating environment, such as a different processor clock speed, different amounts of memory, different network conditions (e.g., slower transmission and/or reception bandwidth), different types of sensor and/or user inputs, or any combination thereof. For example, a user device with a clock speed of 4 Ghz and a 32 GB memory may execute multiple applications. The application developer may use the tools to execute test code that perturbs one or more specified applications to simulate a user device with a 2 GHz clock speed, 8 GB of memory, and slow network access (e.g., GPRS rather than EDGE or LTE). Thus, the specified applications may operate in the simulated (e.g., perturbed) environment while the other applications executing on the user device operate using unperturbed environments (e.g., 4 GHz clock speed, 32 GB memory, LTE, etc.).

It might be a good idea to elaborate on the sensor inputs, as mobile phones are getting more and more sensors onboard. An example sensor that we can perturb now is GPS, where we feed fake GPS coordinates to the app being tested.

In addition to tools to perturb one or more specified application(s) executing on the user device, the tools may include monitoring tools that trace the execution of the specified application(s) while the perturbations are being performed. For example, the monitoring tools may trace execution of processes spawned by the application, monitor an amount of various resources (e.g., energy/power, processor cycles, memory, bandwidth, and the like) that each process consumes, monitor other aspects of the specified application(s), or any combination thereof. While monitoring a set of specified applications whose environments are being perturbed, the monitoring tools may gather data associated with the monitored application(s). The gathered data may be used to analyze the performance of the specified applications when the perturbations occurred.

Furthermore, the tools may enable an application developer to correlate the perturbations with the gathered data to determine which perturbations caused the application to behave in certain ways (e.g., performance degradation, excessive consumption of one or more resources). For example, the correlation tools may correlate the perturbations with the monitored data (e.g., using timestamps or other information) to determine that decreasing an amount of available memory may cause the application to consume additional power, certain network conditions may cause the performance of the application to degrade, a certain processor speed may cause memory usage to increase, etc.

In some implementations, some of the tools (e.g., correlation tools) may execute on a server. For example, the application developer may specify conditions under which to test an application and provide the conditions and the application to a server. The server may create one or more scripts and identify user devices that are suitable for executing the scripts. The server may send test code to each user device (e.g. the user devices may be actual physical devices or virtual machine emulations). The test code may cause perturbations for a set of specified application(s) and invoke monitoring tools to monitor the specified application(s). The statistics and other data gathered by the monitoring tools may be automatically uploaded to the server for analysis (e.g., using the correlation tools) after the test code has completed execution. The server may create a report based on the analysis that identifies conditions that cause the application to behave in an undesirable manner (e.g., performance degradation or excessive resource consumption). Based on the analysis, the application developer may rewrite portions of the application to address the undesirable behavior. The application developer may load the rewritten application into the user device and re-run the test code to determine if the undesirable behavior no longer occurs.

Thus, a framework may allow an application developer to specify the conditions under which one or more applications are to be tested. The framework may create a test code to perturb one or more specified applications without affecting other applications executing on a user device. The test code may invoke monitoring tools to monitor and trace execution of the specified applications. Correlation tools may correlate the monitored data with the test code to identify which perturbations caused issues (e.g., excessive resource consumption, crashes etc.) to enable the application developer to rewrite the application to address (e.g., rectify) the issues.

The framework may thus enable an application developer to use a single device to perturb an environment of an application to simulate or emulate different types of devices with different amounts of resources, different types of networks, different types of network conditions, different types of user input and/or sensor input, other types of network and environmental conditions, or any combination thereof. The framework may reduce an amount of time to test an application because test code executing on a single device may be used to simulate or emulate a large number of different types of devices, different types of networks and network conditions, and different types of environmental (e.g., resource availability) conditions. Reduced testing time may enable applications to be released to the market faster. The framework may also reduce a number of different types of devices and networks that are maintained for testing, thereby reducing testing costs.

The systems and techniques described herein include (1) control, (2) latency, and (3) efficiency. In terms of control, the framework controls what data is generated from mobile devices to enable analysis of whatever situation the software developer requests. In contrast, in conventional data-driven solutions, precise analysis is not possible as the software developer is constrained by whatever data happens to be collected. In terms of latency, in a conventional system, the length of time required to perform data-driven mobile software testing/profiling may be dominated by the time necessary to collect the data. In contrast, the framework described herein dictates what data is collected, under what operating conditions the data is collected, and when the data is collected. Consequently, the framework may enable faster analysis compared to conventional testing. In terms of efficiency, data collection inherently always incurs a cost. For example, mobile applications executing on a mobile device may incur a penalty when collecting performance statistics. Conventional systems lack of control over collected data may result in the collection of redundant data. In contrast, the framework described herein directs data collection based on the input needed for analysis, thereby reducing redundancy and resulting in lower penalties for mobile devices.

Thus, the framework provides a closed-loop for software testing and profiling tools where the analysis drives what data is collected, how the data is collected, and when the data is collected. The framework enables perturbation, where device performance may be deliberately degraded to enable collection of application behavior metrics when the applications experience specific environmental conditions or device conditions. Further, the framework uses a data collection approach that minimizes impact to other applications by (1) localizing effects to only certain application, (2) performing perturbations very quickly (e.g., either a single use or for a limited time), and (3) measuring the degradation of user experience against predefined thresholds (e.g., the intended network latency is above what user can tolerate) when the usability impact is mashed by a detected confounding factor (e.g., CPU perturbed slower while network latency is naturally already high). In the framework described herein, testing, profiling, and analysis algorithms may be used iteratively to quickly address and resolve issues because the input to be used by the analysis algorithms may determine the type of data that is collected. The testing, profiling, and analysis algorithms may be aware of costs and benefits such as algorithm accuracy, user impact and device overhead.

Framework for Application Testing and Analysis

FIG. 1 illustrates an example framework 100 for application testing and analysis according to some implementations. The framework 100 may include one or more user devices, such as a representative user device 102, that are communicatively coupled to a server 104 via a network 106. The network 106 may include wired networks, wireless networks, or a combination of both. For example, the network 106 may utilize one or more wired technologies, such as twisted pair, plain old telephone service (POTS), Ethernet, digital subscriber line (DSL), data over cable service interface specification (DOCSIS), optical cable, USB, proprietary connectors, or other types of wired technologies. As another example, the network 106 may utilize one or more wireless technologies, such as global system for mobile (GSM), code division multiple access (CDMA), long term evolution (LTE), wideband CDMA, universal mobile telephone service (UMTS), Enhanced Data rates for GSM Evolution (EDGE), WiFi (e.g., 802.11), Bluetooth, wireless universal serial bus (USB), or other types of wireless technology.

The user device 102 may be a mobile phone, a camera, a media playback device, a personal digital assistant (PDA), a tablet computing device, a portable computing device, a virtual device (e.g., virtual machine executing on a server) another type of computing device, or any combination thereof. The user device 102 may include one or more processors 108, one or more network interfaces 110, and a memory 112. The memory 112 may include various modules, such as a shell 114, tools 116, and a kernel 118. The memory 112 may be used to store one or more trace files 120.

The shell 114 may execute testing instructions, such as test code 122. For example, the test code 122 may be received from the server 104 and automatically installed on the user device 102. The test code 122 may include commands that invoke one or more of the tools 116 to perturb the operating environment of the user device 102 to simulate or emulate various conditions. In some cases, the test code 122 may be a script written in a scripting language or a type of testing language.

The tools 116 may include a network emulator 124, a power usage module 126, an input simulator 128, a processor controller 130, a statistics module 132, and a trace collector 134. The kernel 118 may include a network emulator driver 136 and a packet capture tool 138. In some implementations, the network emulator driver 136 may be network emulator for windows toolkit (NEWT®), a software module capable of emulating the behavior of different types of wired networks and wireless networks. In addition, in some implementations, the packet capture tool 138 may be a tool such as WinPcap®. The network emulator driver 136 and the network emulator 124 may enable emulation of different types of networks. For example, the user device 102 may be communicatively coupled to the network 106 using an Ethernet connection, while the network emulator driver 136 and the network emulator 124 may be used to emulate various types of wireless networks (e.g., EDGE, GPRS, LTE and the like) and/or wired networks. Thus, the network emulator driver 136 and the network emulator 124 may enable network emulation on a per application basis. The packet capture tool 138 may examine packets travelling to and from specified applications and perform various operations to the packets. For example, the packet capture tool 138 may identify which packets are destined for (or originating from) a specified application (e.g., the Nth application 144) and drop one or more of the identified packets to simulate situations in which packets are lost, such as poor network quality, interference, adverse atmospheric conditions, and the like. Thus, the packet capture tool 138 may enable simulating various types of network conditions on a per application basis. The packet capture tool 138 may enable packets associated with a specified application to be perturbed to emulate or simulate various device conditions (e.g., related to processor, sensor input, power, memory usage, etc.) and/or environmental conditions (e.g., network) for the specified application, without affecting other applications executing on the user device 102.

The memory 112 may include one or more applications 140, such as a first application 142 up to and including an Nth application 144 (where N>1). The tools 116 may be called by the commands in the test code 122 to perturb one or more of the N applications 140 and to monitor and record the behavior of the applications being perturbed. For example, the network emulator 124 may simulate conditions of a type of network specified in the test code 122 for a specified application (e.g., one of the applications 140). To illustrate, a command in the test code 122 may instruct the network emulator 124 to test how a specified application behaves when accessing an EDGE network. The network emulator 124 may instruct the network interface(s) 110 to utilize an EDGE mode whenever the specified application is interacting with the network 106.

The power usage module 126 may measure an amount of power being used by the specified application when the test code 122 is being executed or when instructed by the test code 122. For example, the test code 122 may initiate monitoring power usage of a specified application, perform one or more perturbations, and then stop monitoring the power usage after the one or more perturbations have completed to enable an application developer to measure power usage under specific conditions.

The input simulator 128 may be used to simulate user input, sensor input, and the like. For example, the test code 122 may instruct the input simulator 128 to simulate initiation and/or termination of a voice call, sending and/or receiving a text message, browsing the internet, browsing the internet while a voice call is taking place, and other types of input from a user of the user device 102. In addition, the user input module can mimic how real-world users would click through the elements in an app. This interaction model can be constructed from real-world data, or a simple probabilistic model. As another example, the test code 122 may instruct the input simulator 128 to simulate input from one or more sensors, such as an accelerometer, a global positioning satellite (GPS) unit, a gyroscope, a digital compass, a barometer, an ambient light sensor, a proximity sensor, another type of sensor, or any combination thereof.

The processor controller 120 may enable perturbations that simulate different types of processors. For example, when a specified application is executing, the processor controller 102 may simulate an older processor by reducing a clock speed of one or more of the processors 108 and/or a number of processor cycles dedicated to a particular application, reducing a number of available cores of the processors 108, reducing an amount of cache memory available to one or more of the processors 108, or any combination thereof. As another example, when a specified application is executing, the processor controller 102 may simulate a newer processor by temporarily increasing a clock speed (e.g., overclocking or using turbo boost or other similar technology) of one or more of the processors 108.

The statistics module 132 may monitor and record usage statistics (e.g., resource usage statistics) associated with processes spawned by (or associated with) one or more specified applications. For example, the statistics module 132 may monitor and record information associated with a specified application, such as how many processes are spawned by the application, how much memory each process uses, how many processor cycles each process uses, other process-related data, or any combination thereof. The statistics module 132 may be capable of mapping process identifiers to applications, e.g., identifying which processes are associated with which applications. Thus, the statistics module 132 may monitor and record usage statistics on a per application basis.

The trace collector 134 may monitor execution and create an execution trace for one or more specified applications. For example, the trace collector 134 may record information associated with execution of an application, such as other applications with which the application communicates, which areas of memory the application accesses, and other information associated with execution of the application.

The various information gathered by the tools 116 may be collected and stored as execution data 146 in the gathered data 120. The execution data 146 may be uploaded to the server 104 for analysis. In some cases, the execution data 146 may be automatically (e.g., without human interaction) sent to the server 104 after the shell completes execution of the test code 122.

The server 104 may include one or more processors 148, one or more network interfaces 150, and a memory 152. The memory 152 may be used to store various modules and data, such as a job allocation engine 154, analytic tools 156, and a repository 158. The job allocation engine may include a user impact estimation module 160 and an assignment matching module 162. The user impact estimation module 160 may determine an estimated impact (e.g., slower web browsing, degraded voice quality, etc.) on a user of the user device 102 under certain conditions. The assignment matching module 162 may determine, given a set of one or more user devices (e.g., mobile clients) that are capable of running debugging tasks (e.g., scripts), which debugging tasks should be dispatched to which user devices. For example, if the user devices include different types of processors, different amounts of memory, etc., the assignment matching module 162 may automatically identify which scripts should be sent to which user devices. The assignment matching module 162 may consider factors such as an amount and a length of system perturbations to be performed, an estimated time to execute the script, system requirements of the script, and so on. For example, scripts that specify a certain type of processor (e.g., a certain clock speed, a number of cores, an amount of cache, etc.) may be sent to user devices that either have the specified type of processor or may be perturbed to emulate the specified type of processor.

The analytic tools 156 may include various tools to analyze the execution data 146, such as hypothesis testing 164, anomaly detection 166, and filters 168. The hypothesis testing 164 may correlate the test code 122 with the execution data 146 to determine whether various hypotheses were proven or not proven during the execution of the test code 122. For example, based on the execution data 146, the hypothesis testing 164 may determine that a first hypothesis (e.g., an application communicating over an EDGE network consumes more power compared to communicating over a GPRS network) is correct but may determine that a second hypothesis (e.g., a smaller amount of available memory increases a number of processor cycles used by an application) is incorrect. The analytic tools 156 may enable application developers to provide rules that define what type of events constitute abnormal behavior and to analyze the gathered data 120 to identify when abnormal behavior occurred during the perturbations. For example, an application developer may identify abnormal behavior as occurring when an application consumes greater than a threshold amount of one or more of (i) memory, (ii) processor cycles, (iii) transmission or reception bandwidth, (iv) energy/power, or another type of resource. Another example of abnormal behavior would be crashes, such as an application crash, an operating system crash, a crash caused by flaky hardware, and the like.

The filters 168 may enable an application developer to filter the execution data 146 based on different criteria. The repository 158 may include previously gathered data 170, such as data gathered from executing scripts other than the test code 122. The repository 158 may enable an application developer to use the analytic tools 156 to analyze both the execution data 146 and the previously gathered data 170. For example, the application developer may run multiple scripts and analyze the resulting data (e.g., the execution data 146 and the previously gathered data 170) to test multiple hypotheses. The anomaly detection 166 may enable an application developer to analyze the execution data 146 and/or the previously gathered data 170 to identify unusual or unexpected results. For example, the anomaly detection 166 may identify an anomaly to a particular hypothesis (e.g., the hypothesis "X occurs when Y occurs" is correct except when Z occurs along with Y).

Thus, an application developer may specify conditions under which an application is to be tested. The job allocation engine 154 (or the application developer) may create one or more test scripts, such as the test code 122. The job allocation engine 154 may identify which user device is suitable for executing which set of test code based on the conditions specified in each set of test code and the capabilities of each user device and send each set of test code to a user device. For example, the server 104 may send the test code 122 to the user device 102 based on the test code 122 and the capabilities of the user device 102. The application developer may initiate execution of the test code 122 or the test code 122 may automatically begin executing after download to the user device 102. The test code 122 may include commands that invoke the tools 116 to perform various perturbations to one or more specified applications. For example, the perturbations may include one or more of (a) emulating various types of networks, (b) simulating various types of user input and sensor input, (c) simulating network conditions such as dropped packets, or (d) emulating various types of devices with different amounts of resources (e.g., processing power, memory, power/energy, and the like). The test code 122 may include commands that invoke the tools 116 to gather data associated with the specified applications when the perturbations are occurring. For example, the tools 116 may gather data, such as statistics associated with processes spawned by the specified application(s), power usage associated with the specified application(s), execution traces of the processes associated with the specified application(s), etc. The gathered data 120 resulting from monitoring the perturbations may be automatically uploaded to the server 104 for analysis (e.g., after the test code 122 has completed executing). The analysis may include determining whether various hypotheses were proven, detecting anomalies, estimating an impact on users etc.

The framework 100 may be used for data-driven analysis to test and profile mobile applications because of the tight coupling between the monitoring tools (e.g., the power usage module 126, the statistics module 132, and the trace collector 134) on the user device 102 and the analysis algorithms (e.g., the analytic tools 156) on the server 104. The tools 116 may enable creating perturbations to meet specific criteria, such as accuracy criteria and latency criteria. The framework 100 may use the tools 116 that execute on mobile devices (e.g., the user device 102) to perturb (e.g., simulate or emulate) various environmental conditions and/or various device characteristics. The perturbations may include perturbing environmental conditions such as network conditions (e.g., latency, handoffs), sensor inputs (e.g., location, accelerometers), and/or user inputs. In addition, the framework 100 may be easily extended to other related environmental conditions. The perturbations may additionally or alternatively simulate or emulate various device conditions, such as memory constraints, processor constraints, sensor constraints, different hardware component combinations, and so on. In addition to perturbation, the tools 116 may enable the collection of both global device state information and per application state information (e.g., metrics that relate to one or more specified applications).

The framework 100 may include orchestration algorithms that architecturally sit between analysis algorithms and mobile device perturbation/monitoring tools. The orchestration algorithms may perform various tasks, such as (1) assigning and scheduling data collection jobs and perturbation roles (e.g., cause the user device 102 to temporary assume a specific configuration) to user devices based on application developer goals, (2) selecting a set of subsequent conditions to test to achieve analysis goals, and (3) creating primitives for common operations useful in analysis, such as a condition search that search for (i) specific conditions (e.g., specified network latency level), (ii) when a particular type of application behavior (e.g., crash) occurs, or (iii) an anomaly search that scans over wide areas of condition parameters to identify anomalous application behavior defined by an application developer. The framework 100 may be used to (1) estimate a usability impact of certain conditions and/or to (2) assign and schedule tests based on the usability impact.

The framework 100 may provide application developers with (1) control (e.g., greater control over testing), (2) latency (e.g., less time between testing and analysis), and (3) efficiency. In terms of control, the framework 100 may enable specific conditions (e.g., perturbations) to be created for a specified application without affecting other applications executing on the user device 102. In terms of latency, the length of time required to perform mobile software testing and analysis may be reduced by reducing the time to perform the testing and collect the data. The framework 100 may enable an application developer to specify what data is collected and when the data is collected, thereby reducing the time taken to collect the data and enabling faster analysis. The framework 100 may reduce the latency between testing an application and analyzing the results of testing the application. In terms of efficiency, when collecting performance statistics, a cost in terms of an overhead penalty to the operations of other applications may be incurred. Conventional systems may gather all a large amount of data, incurring a huge cost in terms of the overhead (e.g., resources) used to gather the data. In contrast, in the framework 100, the overhead penalty may be reduced because the execution data 146 may be gathered for specified applications at specified time periods based on the test code 122.

In the framework 100, the test algorithms and the analytics algorithms may operate interactively. For example, the data that is to be gathered as input for the analytics algorithms may determine which tests are performed (e.g., which scripts are executed). The server 104 may send scripts to one or more user devices, such as the user device 102. The scripts may specify the application(s) that are to be tested, the perturbations to be performed to simulate/emulate various system/environment configurations, and the data to be collected. After the scripts have executed, the server 104 may analyze the data collected from the one or more user devices to identify any issues (e.g., excessive power consumption, excessive memory consumption, or the like). Based on the analysis, an application developer may modify an application and then select or create one or more scripts to determine if the modifications have addressed the issues. In addition, based on the test results so far, the system can decide which test conditions to focus on (e.g., a particular range of network latency).

Thus, the framework 100 may provide a closed-loop for software testing, profiling, and analysis by enabling perturbation on a per application basis to simulate or emulate various conditions. For example, perturbation may include simulating performance degradation and collecting metrics associated with how the application behaves when experiencing a certain type of environment or device condition. In some cases, the framework 100 may be used with live users, e.g., multiple users may be provided with user devices that have the various tools installed. Live users may be used because the framework 100 reduces an impact on users by (1) localizing effects to only specified application(s) and (2) performing the perturbation(s) very quickly (single use or for a limited time) or during periods of non-use or minimal use (e.g., late at night or early in the morning). The framework 100 may enable an application developer to test one or more applications, analyze the results, address any issues by modifying the application, and re-test the applications to determine if the modifications have addressed the issues. The testing may be performed with live users, without live users, or a combination of both.

Figure 2:
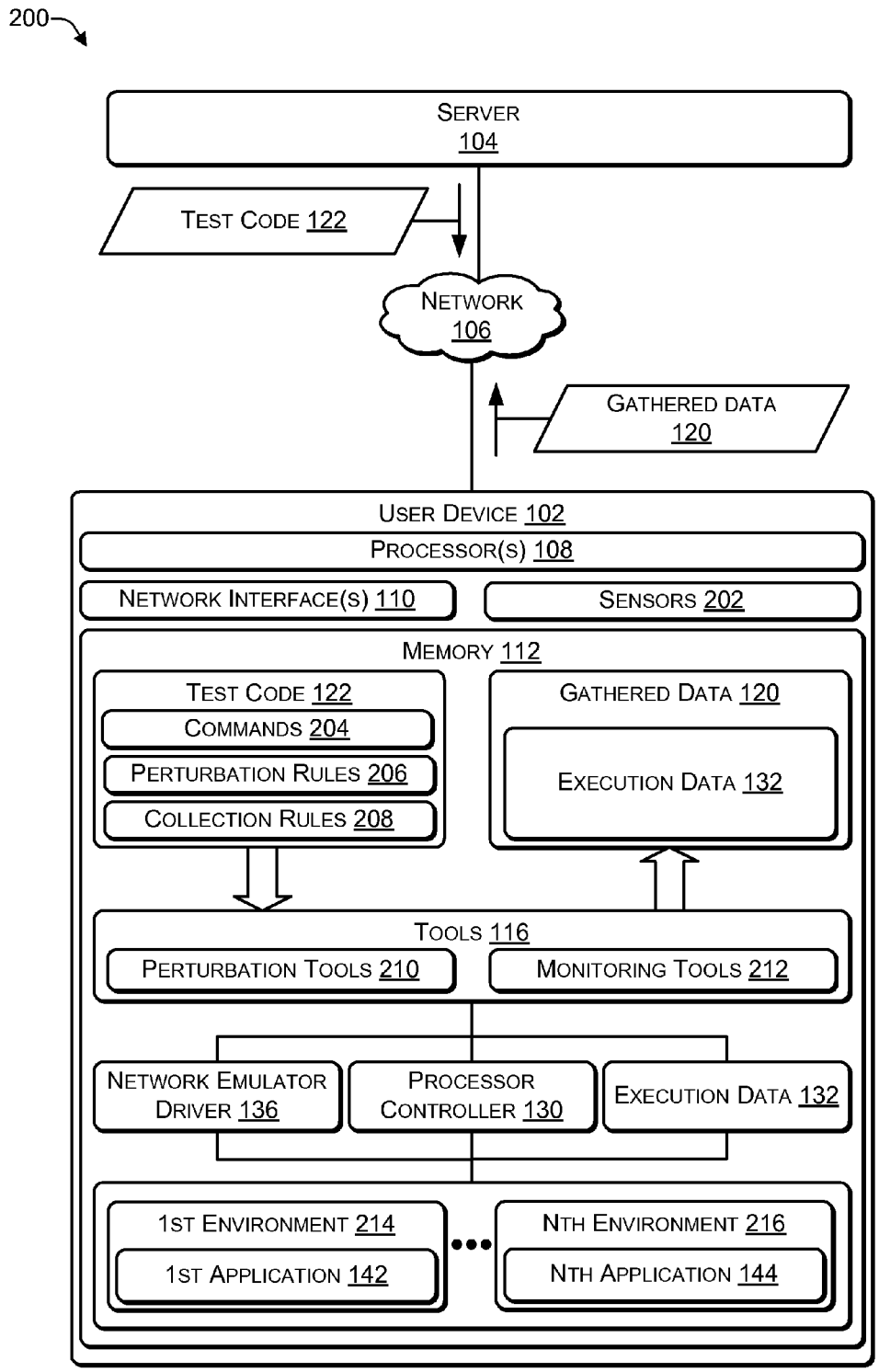
FIG. 2 illustrates an example framework that includes perturbation tools and monitoring tools according to some implementations.

FIG. 2 illustrates an example framework 200 that includes perturbation tools and monitoring tools according to some implementations. The framework 200 includes the user device 102 communicatively coupled to the server 104 using the network 106. The user device 102 may include one or more sensors 202, such as a GPS (e.g., location) sensor, an accelerometer, a camera, or another type of sensor.

The test code 122 may be downloaded to the user device 102 from the server 104. The test code 122 may include one or more commands 204, one or more perturbation rules 206, and one or more collection rules 208. The commands 204 may include commands written in a shell language to use the tools 116 to perform various perturbations and to monitor and record various data for a specified set of applications from the N applications 142 to 144. For example, the tools 116 may include perturbation tools 210 (e.g., the network emulator 124, the input simulator 128, and the processor controller 130 of FIG. 1) and monitoring tools 212 (e.g., the power usage module 126, the statistics module 132, and the trace collector 134). The tools 116 may enable a user to perturb an environment associated with each application on a per application basis. For example, each of the N applications 142 to 144 may have a corresponding environment (e.g., available memory, available processor speed, available processor cores, available network bandwidth, and the like). To illustrate, the first application 142 may have a first environment 214 and the Nth application 144 may have an Nth environment 216. Initially, each of the N environments may include the resources of the user device 102, such as the processors 108, the memory 112, etc. When the test code 122 is executed, the perturbations created by the test code may affect the environment of some but not all of the N applications 142 to 144.

The perturbation rules 206 may specify various perturbations (e.g., various system configurations that are to be emulated, various network conditions that are to be emulated, and the like). The perturbation rules 206 may specify an order of the various perturbations and a length of time that each perturbation is to be performed when a specified set of one or more applications being execution. The collection rules 208 may specify execution data (e.g., performance metrics, such as process statistics, execution traces, etc.) that are to be recorded when the various perturbations are taking place. The perturbation rules 208 may enable perturbation on a per application basis. The perturbation rules 208 may be viewed as creating an environment for the specified applications because the perturbation rules may control how the specified applications view and access the resources of the user device 102. The resources controlled by the perturbation rules 208 may include (but are not limited to) a type of the network 106, conditions associated with the network 106, available transmission and/or reception bandwidth, an available power/energy, available processor power (e.g., clock-speed, number of cores, cache, etc.), and an available amount of the memory 112. The perturbation rules 208 may include user-interaction functionality (e.g., the input simulator 128) to simulate user input, such as mouse-click and keyboard activities.

The monitoring tools 212 may monitor data on a per application basis to minimize overhead (e.g., resource usage) of the user device 102. Based on the monitoring, the monitoring tools 212 may create the execution data 132. The execution data 132 may include data such as an amount of processor time or processor cycles consumed, memory utilization, energy consumption, network traffic received and transmitted, other application-specific data, or any combination thereof.

The test code 122 may identify a type of data to be collected (e.g., memory usage, processor cycles used, etc.), how to collect the data, and when to collect the data (e.g., when perturbation X occurs). The test code 122 may identify (1) the targeted applications (e.g., applications that have been targeted for perturbation and monitoring), the perturbations to be performed to create specific system/environment configurations in which to run the targeted applications, and the execution data 132 (e.g., behavioral metrics) that is to be collected.

The monitoring tools 212 may collect at least some of the execution data 132 in response to detecting specified events. For example, the monitoring tools 212 may initiate an execution trace when memory usage exceeds a predetermined threshold. To illustrate, the monitoring tools 212 may analyze incoming data, detect specified events, and record data for specified events. After the test code 122 has completed executing, the execution data 132 gathered by the monitoring tools 212 may be sent to the server 104 for analysis. For example, the commands 204 may include a command to send the execution data 132 to the server 104. As another example, after the test code 122 has completed executing, the monitoring tools may automatically (e.g., without human interaction) send the execution data 132 to the server 104.

Figure 3:
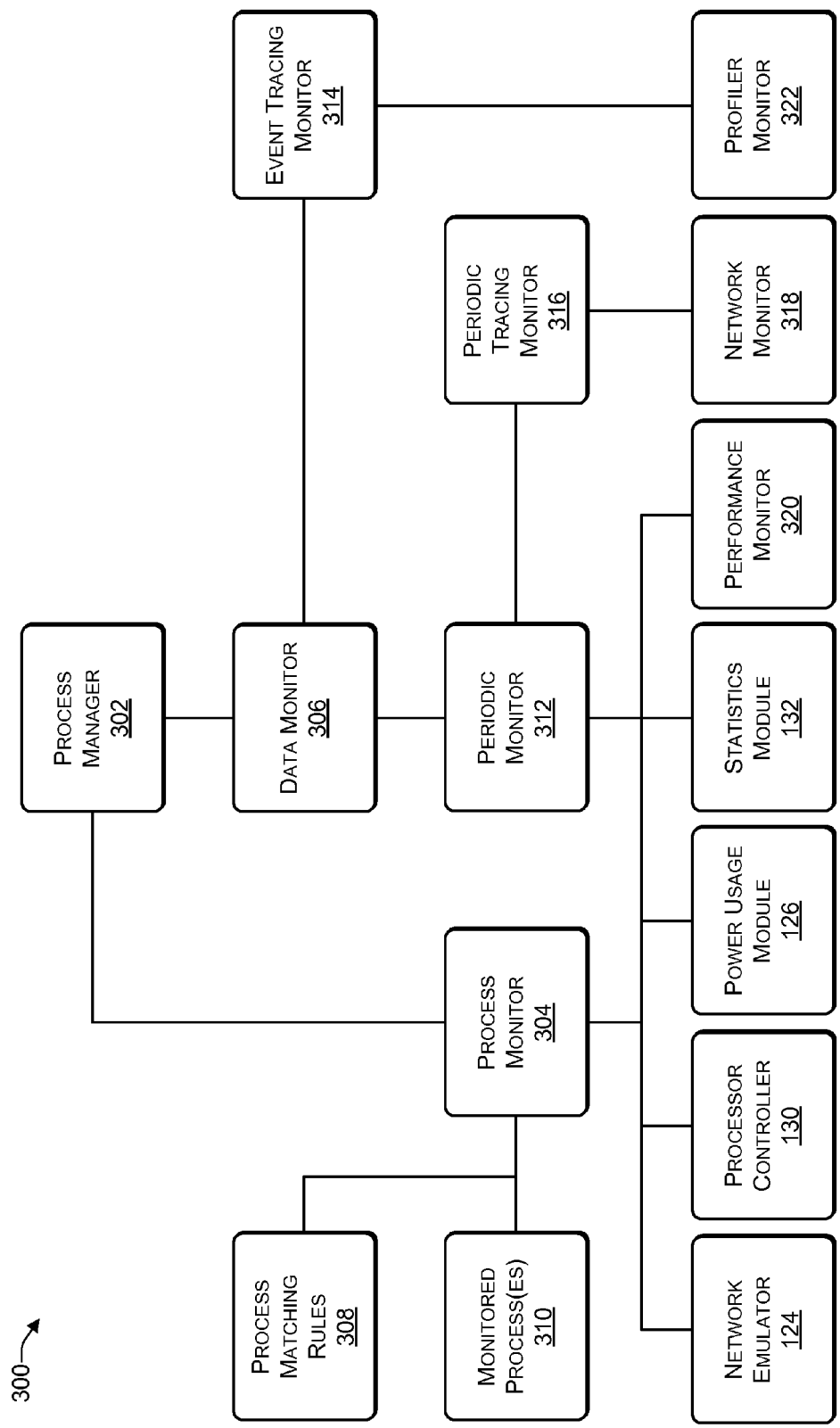
FIG. 3 illustrates an example architecture for perturbation and monitoring according to some implementations.

FIG. 3 illustrates an example architecture 300 for perturbation and monitoring according to some implementations. The architecture 300 includes a process manager 302 that may receive data from a process monitor 304 and a data monitor 306. The process monitor 304 may use process matching rules 308 to identify which processes to perturb, monitor, and collect data from. For example, the process matching rules 308 may identify which processes are associated with which application to enable the process monitor 304 to perturb and monitor an environment of those processes that are associated with one or more specified application(s). The process matching rules 308 may enable gathering data on a per application basis.

The data monitor 306 may receive data from a periodic monitor 312 and an event tracing monitor 314. The periodic monitor 312 may periodically (e.g., at predetermined time intervals) determine various information associated with the monitored processes 310, such as memory consumption, power/energy consumption, processor consumption, and the like. The event tracing monitor 314 may perform trace execution of the monitored processes 310 when events specified in the test code occur. The periodic monitor 312 may receive data from a periodic event tracing monitor 316. The periodic tracing monitor 316 may periodically (e.g., at predetermined time intervals) receive data associated with the monitored processes 310. For example, the periodic tracing monitor 316 may periodically receive information from a network monitor 318 that identifies network usage of the monitored processes 310.

The periodic monitor 312 may, at regular intervals, perform various perturbations using the network emulator 124 (e.g., to emulate different types of networks) and the processor controller 130 (e.g., to emulate different types of processors). The periodic monitor 312 may periodically monitor various data associated with the monitored process 310, such as monitoring power/energy usage using the power usage module 126, monitoring various statistics using the statistics module 132, and monitoring a performance of the monitored processes 310 using a performance monitor 320.

Thus, the architecture 300 may be used to perturb applications on a per application basis. For example, the process matching rules 308 may enable processes associated with a specified application to be identified and perturbed, without affecting other applications that are executing on a user device. For example, if the test code specifies that application X is to be perturbed, the process matching rules 308 may be used to determine (e.g., identify) that processes X1, X2, XN are associated with application X. The network emulator 124 may be used to emulate various network conditions for communications associated with (e.g., originating from or destined for) the processes associated with application X without affecting other applications. The processor controller 130 may be used to emulate various types of processors (e.g., various clock speeds, various numbers of processing cores, various amounts of cache memory, etc.) used to execute the processes associated with application X without affecting other applications. The power usage module 126 may be used to emulate various types of power usage (e.g., low battery, power drain by another application, etc.) for the processes associated with application X without affecting other applications. The input simulator 128 of FIG. 1 may be used to simulate various types of inputs to the processes associated with application X without affecting other applications.

Figure 4:
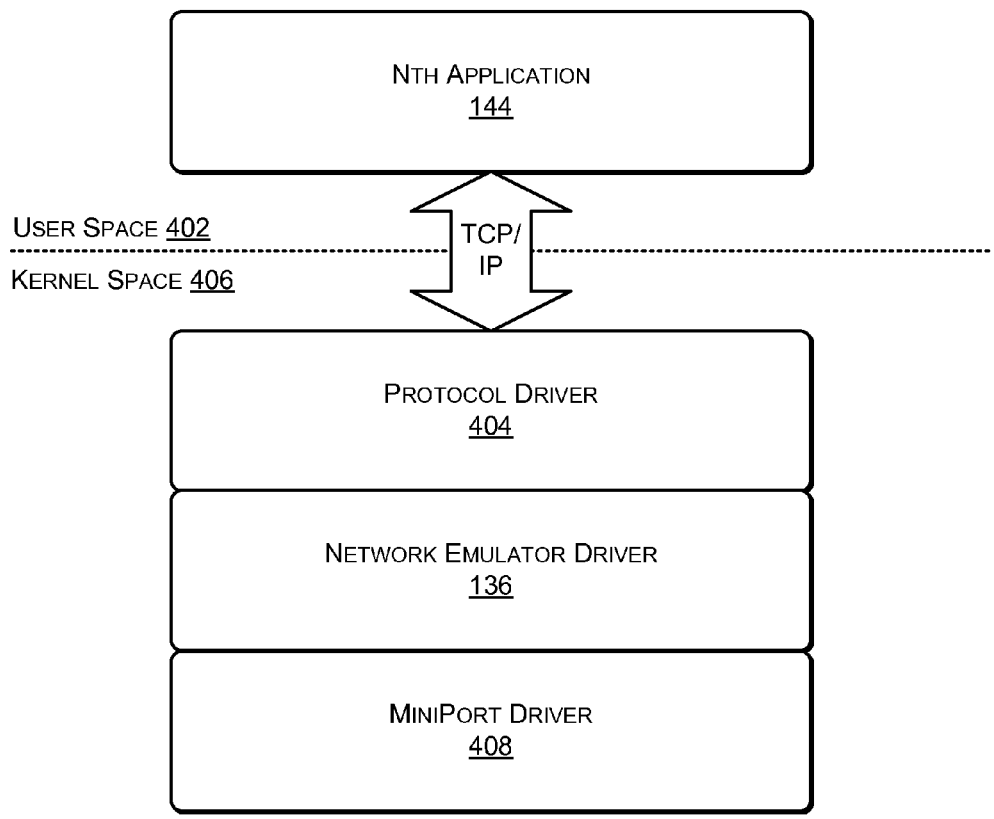
FIG. 4 illustrates an example architecture for network emulation according to some implementations.

FIG. 4 illustrates an example architecture 400 for network emulation according to some implementations. The architecture 400 enables network emulation (e.g., network perturbation) on a per application basis.

Applications, such as a representative Nth application 144 (where N>0) may execute in user space 402. The Nth application 144 may communicate with a protocol driver 404 in kernel space 406 using a communication protocol, such as Transmission Control Protocol (TCP)/Internet Protocol (IP). In FIG. 3, TCP/IP is used as an example of a communication protocol that may be used. Of course, depending on the implementation, other communication protocols may be used in addition to or instead of TCP/IP. The protocol driver 406 may communicate with the network emulator driver 136. For example, in some implementations, the network emulator driver 136 may be network emulator for Windows™ toolkit (NEWT). The network emulator driver 136 may communicate with a miniport driver 408.

Thus, using the architecture 400, different types of networks may be perturbed (e.g., emulated) to test the behavior of applications executing on a user device. Using the architecture 400, an application developer may determine whether a particular application is well behaved when communicating over different types of networks.

Furthermore, while FIGS. 1-4 set forth examples of suitable architectures for application perturbation and monitoring, numerous other possible architectures, frameworks, systems and environments will be apparent to those of skill in the art in view of the disclosure herein. Additionally, while the examples herein have been described in the environment of application perturbation and monitoring, other implementations may be directed to other types of application testing.

Example Processes

Figure 5:
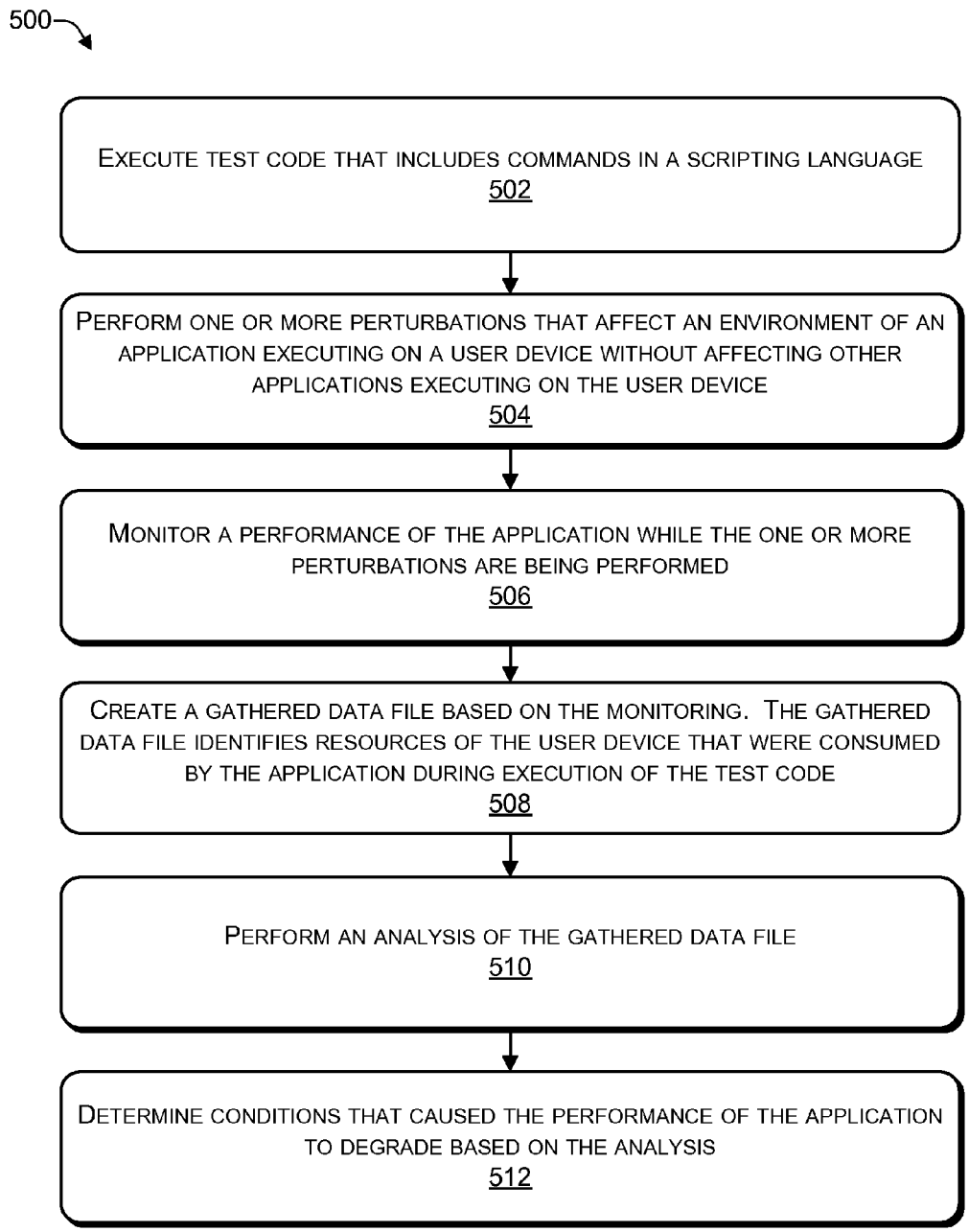
FIG. 5 illustrates a flow diagram of an example process that includes executing a test code according to some implementations.
Figure 6:
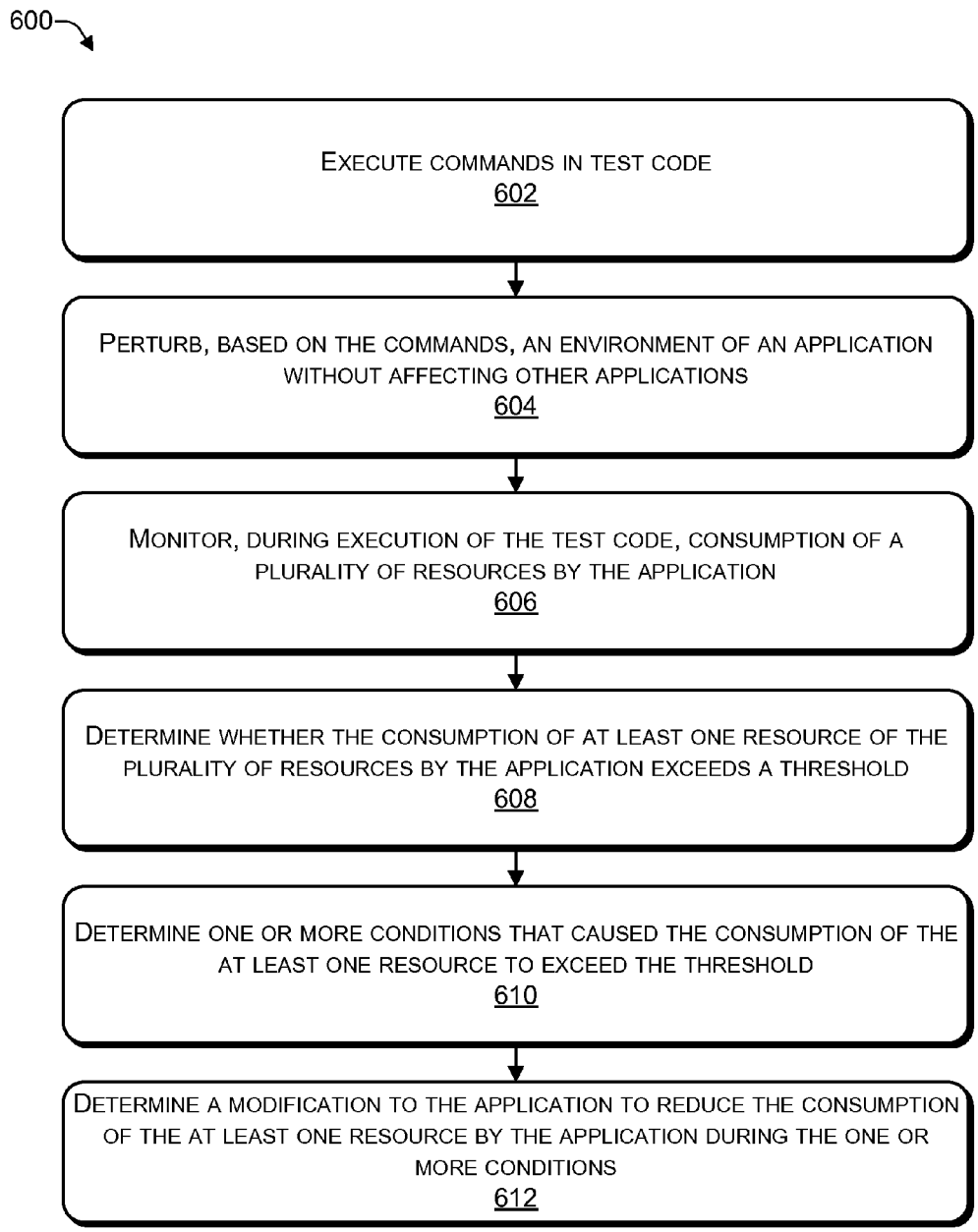
FIG. 6 is a flow diagram of an example process that includes perturbing an application according to some implementations.
Figure 7:
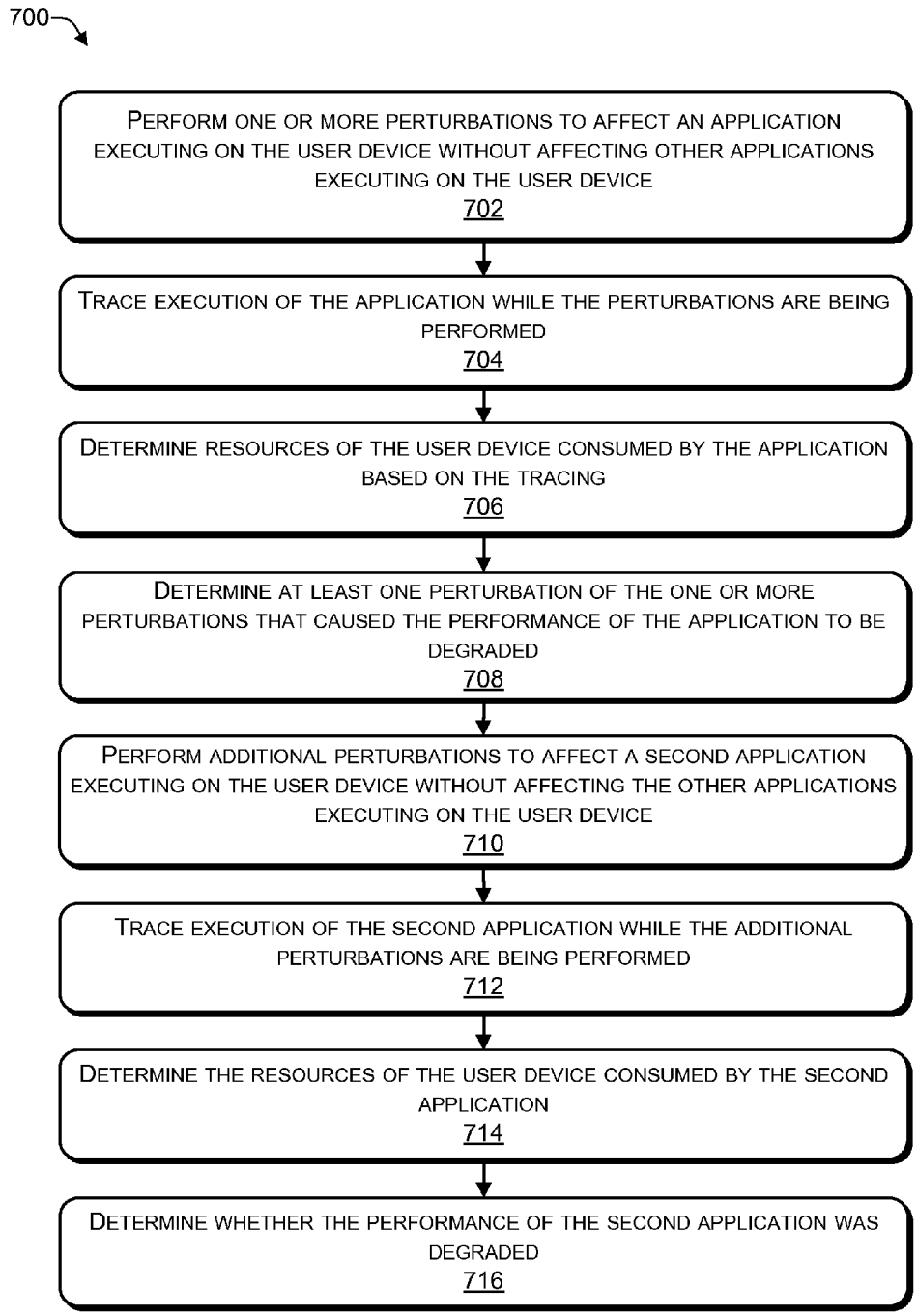
FIG. 7 is a flow diagram of an example process that includes tracing execution of an application according to some implementations.

In the flow diagrams of FIGS. 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600 and 700 are described with reference to the frameworks 100, 200, 300, and 400, described above, although other models, frameworks, systems and environments may be used to implement these processes.

FIG. 5 illustrates a flow diagram of an example process 500 that includes executing test code according to some implementations. The process 500 may be executed by the framework 100 or 200.

At 502, test code that includes commands in a scripting language may be executed. For example, in FIG. 2, the user device 102 may execute the test code 122 that includes the commands 204.

At 504, one or more perturbations that affect an environment of an application executing on a user device may be performed without affecting other applications executing on the user device. For example, in FIG. 2, the commands 204 may use the tools 116 to create perturbations for at least one environment without affecting the other environments of the N environments 214 through 216.

At 506, performance of the application may be monitored while the one or more perturbations are being performed. For example, in FIG. 2, the monitoring tools 212 may monitor the execution of application(s) associated with the environment(s) that are being perturbed. To illustrate, if the test code 122 specifies perturbations for the Nth environment 216 associated with the Nth application 144, the monitoring tools 212 may monitor execution of the Nth application 144 while the Nth environment 216 is being perturbed. The monitoring may include tracing execution of the Nth application 144 and identifying resource usage by the Nth application 144.

At 508, a gathered data file may be created based on the monitoring. The gathered data file may include information identifying resources of the user device that were used by the application during execution of the script. For example, in FIG. 2, the monitoring tools 312 may create the gathered data 120 based on monitoring one or more of the N applications 142 to 144. The gathered data 120 may include information associated with the resource usage of the monitored applications, such as which resources (e.g., memory, processors, power/energy, network bandwidth, etc.) were used, a maximum amount of each resource that was used, a minimum amount of each resource that was used, and the like.

At 510, an analysis of the gathered data file may be performed. For example, in FIG. 1, the server 104 may analyze the gathered data 120 using the analytic tools 156.

At 512, conditions that cause the performance of the application to degrade may be determined based on the analysis. For example, the analytic tools 156 may identify conditions created by the perturbations that caused the performance of one or more of the N applications 142 to 144 to degrade when the test code 122 was being executed.

Thus, an application developer may specify one or more applications that are to be tested and the environmental conditions in which to test the specified applications. A server may create one or more scripts and send them to one or more user devices for execution on the user device. Each of the scripts may perform perturbations to an environment corresponding to each of the specified applications and monitor the execution of the specified applications. The data gathered during the monitoring may be analyzed by the server to identify conditions that cause performance of the application to degrade. Based on the analysis, an application developer may modify the application by rewriting portions of the software instructions that comprise the application and retest the modified application to determine whether the performance of the rewritten application is degraded under the same conditions.

FIG. 6 is a flow diagram of an example process 600 that includes perturbing an application according to some implementations. The process 600 may be executed by the framework 100 or 200.

At 602, commands in test code may be executed. For example, in FIG. 2, the commands 204 in the test code 122 may be executed by the user device 102.

At 604, based on the commands in the script, an environment of an application may be perturbed without affecting other applications. For example, in FIG. 2, the commands 204 may use the perturbation tools 210 to perform perturbations of the Nth environment 216 that corresponds to the Nth application 144 that is to be tested without affecting the other applications. An application may be perturbed without affecting other applications by using the packet capture tool 138 to identify packets associated with the application and only perturbing the identified packets. In this way, packets associated with the other applications may remain unaffected by the perturbations. Similarly, a system similar to the architecture described in FIG. 3 may be used to monitor the processes associated with a specified application (or set of applications) and perturb those processes to simulate or emulate various types of network conditions (e.g., using the network emulator 124), various types of processors (e.g., using the processor controller 130), or various types of power usage (e.g., using the power usage module 126), various types of input (e.g., using the input simulator 128), etc. Of course, other types of device-specific or network-specific conditions may be emulated or simulated for a specified application without affecting the other applications using the techniques and systems described herein.

At 606, during execution of the test code, consumption of the plurality of resources by the application may be monitored. For example, in FIG. 2, during execution of the test code 122, the monitoring tools 212 may monitor resources that the Nth application 144 consumes, such as usage of (i) the memory 112, (ii) the processors 108, (iii) the network interfaces 110, (iv) power/energy usage, etc.

At 608, a determination may be made whether the consumption by the application of at least one resource of the plurality of resources exceeds a threshold. For example, in FIG. 2, the server 104 may analyze the gathered data 120 to determine whether at least one of the resources consumed by the Nth application 144 exceeds a threshold.

At 610, one or more conditions that caused the consumption of the at least one resource to exceed the threshold may be determined. For example, in FIG. 1, the analytic tools 156 may identify one or more conditions that caused the consumption of the at least one resource to exceed the threshold by correlating the commands in the test code 122 with the gathered data 120.

At 612, a determination may be made as to a modification to the application to reduce the consumption of the at least one resource by the application during the one or more conditions. For example, in FIG. 1, the analytic tools 156 may identify modifications to the application to reduce the consumption of at least one resource when the one or more conditions occur. The analytic tools 156 may generate a report based on the analysis that recommends modifications to the application.

Thus, an application developer may specify one or more applications that are to be tested and the environmental conditions in which to test the specified applications. A server may create one or more scripts and send the scripts to one or more user devices for execution on the user devices. Each of the scripts may perform perturbations to an environment corresponding to each of the specified applications and monitor the resource consumption of the specified applications. The data gathered during the monitoring may be analyzed by the server to determine whether the resource consumption exceeds a threshold. Based on the analysis, the server may generate a report that recommends modifications to the application to reduce the resource consumption. An application developer may modify the application based on the recommendations and re-test the application to determine whether the modifications address the excessive resource consumption (e.g., by reducing the consumption of the resource when certain conditions arise).

FIG. 7 is a flow diagram of an example process 700 that includes tracing execution of an application according to some implementations. The process 700 may be executed by the framework 100 or 200.

At 702, one or more perturbations that affect an application executing on a user device may be performed without affecting other applications executing on the user device. For example, in FIG. 2, the perturbation tools 210 may be used to perturb the first environment 214 associated with the first application 142. The perturbation tools 210 may perform perturbations to the first environment 214 without affecting the other environments of the other applications.

At 704, execution of the application may be traced while the perturbations are being performed. For example, in FIG. 2, the monitoring tools 212 may monitor execution of the first application 142 while the perturbation tools 210 are performing the perturbations to the first environment 214.

At 706, resources of the user device that are consumed by the application may be determined based on the tracing. For example, in FIG. 2, the server 104 may analyze the gathered data 120 to determine which of the resources of the user device 102 were consumed by the first application 142 and how much of each resource was consumed.

At 708, at least one perturbation of the one or more perturbations that caused the performance of the application to be degraded may be determined. For example, in FIG. 1, the analytic tools 156 may determine whether any of the perturbations caused by the test code 122 to the first environment 214 caused the performance of the first application 142 to be degraded.

At 710, additional perturbations to affect a second application executing on the user device may be performed without affecting the other applications executing on the user device. For example, in FIG. 2, the perturbation tools 210 may perturb the Nth environment 216 to affect the Nth application 144 without affecting other applications in the applications 142 to 144.

At 712, execution of the second application may be traced while the additional perturbations are being performed. For example, in FIG. 2, the monitoring tools 212 may monitor execution of the Nth application 144 while the perturbation tools 210 are performing perturbations to the Nth environment 216.

At 714, the resources of the user device that are being consumed by the second application may be determined. For example, in FIG. 2, the monitoring tools 212 may determine how much of the resources of the user device 102 that the Nth application 144 is consuming while the perturbation tools 210 are performing perturbations to the Nth environment 216.

At 716, a determination may be made whether the performance of the second application was degraded. For example, the server 104 may be used to analyze the gathered data 120 to determine whether the performance of the Nth application 144 was degraded while the perturbation tools 210 were performing perturbations to the Nth environment 216.

In some implementations, the perturbations to affect the application (e.g., 702) and the additional perturbations to affect the second application (e.g., 710) may be performed substantially contemporaneously (e.g., substantially in parallel). For example, the test code 122 may perform perturbations substantially contemporaneously to more than one of the N applications 142 to 144.

Thus, multiple applications executing on the user device may be tested substantially contemporaneously. For example, test code (e.g., a script comprising commands) may create perturbations to environments associated with one or more specified applications. Monitoring tools may monitor resource usage of each of the specified applications to create user gathered data for each application. The gathered data may be analyzed to determine whether the performance of the specified applications was degraded or whether the resource usage of each of the specified applications was excessive. Based on the analysis, an application developer may modify the applications to address any issues, such as performance degradation or excessive resource consumption. The application developer may test the modified applications to determine whether the modifications address the issues.

Example Computing Device and Environment

Figure 8:
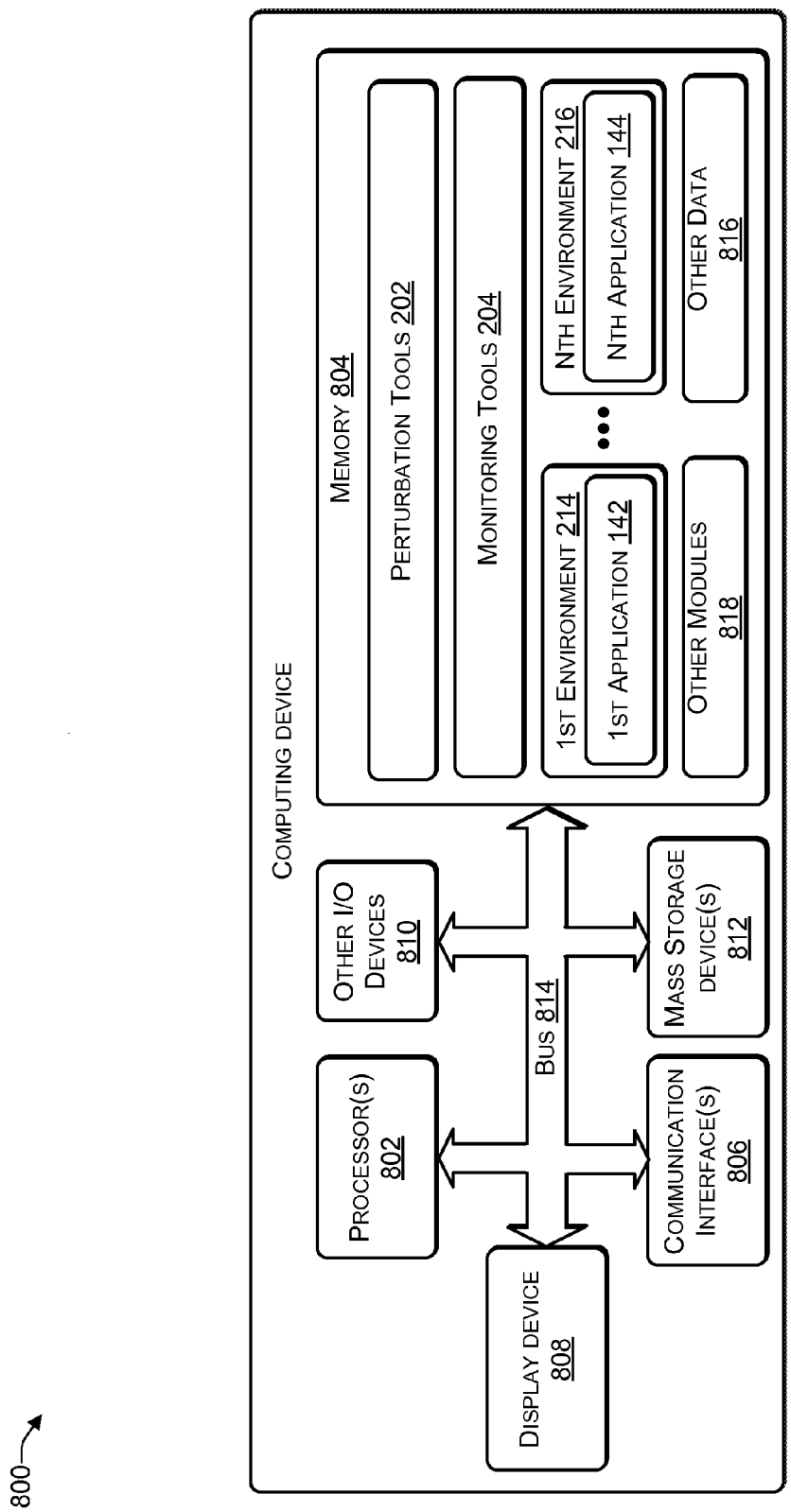
FIG. 8 is a block diagram of an example computing device and environment according to some implementations.

FIG. 8 illustrates an example configuration of a computing device 800 and environment that can be used to implement the modules and functions described herein. The computing device 800 may include at least one processor 802, a memory 804, communication interfaces 806, a display device 808, other input/output (I/O) devices 810, and one or more mass storage devices 812, able to communicate with each other, such as via a system bus 814 or other suitable connection.

The processor 802 may be a single processing unit or a number of processing units, all of which may include single or multiple computing units or multiple cores. The processor 802 can be implemented as one or more microprocessors, microcomputers, microcontrollers, digital signal processors, central processing units, state machines, logic circuitries, and/or any devices that manipulate signals based on operational instructions. Among other capabilities, the processor 802 can be configured to fetch and execute computer-readable instructions stored in the memory 804, mass storage devices 812, or other computer-readable media.

Memory 804 and mass storage devices 812 are examples of computer storage media for storing instructions which are executed by the processor 802 to perform the various functions described above. For example, memory 804 may generally include both volatile memory and non-volatile memory (e.g., RAM, ROM, or the like). Further, mass storage devices 812 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be media capable of storing computer-readable, processor-executable program instructions as computer program code that can be executed by the processor 802 as a particular machine configured for carrying out the operations and functions described in the implementations herein.

The computing device 800 may also include one or more communication interfaces 806 for exchanging data with other devices, such as via a network, direct connection, or the like, as discussed above. The communication interfaces 806 can facilitate communications within a wide variety of networks and protocol types, including wired networks (e.g., LAN, cable, etc.) and wireless networks (e.g., WLAN, cellular, satellite, etc.), the Internet and the like. Communication interfaces 806 can also provide communication with external storage (not shown), such as in a storage array, network attached storage, storage area network, or the like.

A display device 808, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, and so forth.

Memory 804 may include modules and components for application perturbation, monitoring, and analysis according to the implementations herein. In the illustrated example, memory 804 includes the perturbation tools 202, the monitoring tools 204 and the applications 142 to 144, as discussed above. Each application may have a corresponding environment which may be perturbed using the perturbation tools 202. For example, the first environment 214 may be associated with the first application 142 and the Nth environment 216 may be associated with the Nth application 144. Memory 804 may also include other data and data structures described herein, such as other data 816. Memory 804 may further include one or more other modules 818, such as an operating system, drivers, communication software, or the like. The other data 816 may include data stored while performing the functions described above and data used by the other modules 818.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 8 as being stored in memory 804 of computing device 800, the perturbation tools 202 and the monitoring tools 204, or portions thereof, may be implemented using any form of computer-readable media that is accessible by computing device 800. As used herein, "computer-readable media" includes computer storage media and communication media.

Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically eraseable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification.

The invention claimed is:

1. A method comprising:
under control of one or more processors configured with executable instructions,
executing test code that includes commands;
performing, based on the commands, one or more perturbations of an environment associated with an application executing on a user device;
monitoring a performance of the application while the one or more perturbations are being performed;
creating a gathered data file based on the monitoring, the gathered data file identifying resources of the user device that were consumed by the application during execution of the test code;
correlating the gathered data file with the one or more perturbations; and
identifying, based on the correlating, at least one condition that caused the performance of the application to change.

2. The method as recited in claim 1, wherein monitoring the performance of the application while the one or more perturbations are being performed comprises:
monitoring the performance of one or more processes spawned by the application.

3. The method as recited in claim 1, wherein the one or more perturbations comprise emulating a reduced clock speed of the one or more processors of the environment associated the application.

4. The method as recited in claim 1, wherein the one or more perturbations comprise reducing an amount of memory available to the application.

5. The method as recited in claim 1, wherein:
the one or more perturbations comprise emulating input from at least one sensor of the user device,
the at least one sensor includes at least one of an accelerometer to provide data associated with movement of the user device or a global positioning system (GPS) to provide a location of the user device.

6. The method as recited in claim 1, wherein the one or more perturbations comprise emulating a network problem by at least one of:
reducing a bandwidth available to the application,
simulating user interaction with the application,
increasing a latency of data being received by the application, or
dropping one or more packets of the data being sent to the application.

7. The method as recited in claim 1, wherein monitoring the performance of the application while the one or more perturbations are being performed comprises:
identifying at least one process associated with the application; and
monitoring resources being consumed by the at least one process.

8. The method as recited in claim 7, where the resources include:
an amount of a memory that is being consumed by the at least one process, and
an amount of cycles of the one or more processors that is being consumed by the at least one process.

9. One or more computer-readable storage media storing instructions executable by one or more processors to perform operations comprising:
executing commands in a script;
perturbing, based on the commands in the script, an environment of an application being executed by the one or more processors;
monitoring, during execution of the script, consumption of a plurality of resources by the application;
correlating the commands in the script with the consumption of the plurality of resources by the application; and
determining, based on the correlating, that consumption by the application of at least one resource of the plurality of resources exceeds a threshold.

10. The one or more computer-readable storage media as recited in claim 9, the operations further comprising:
identifying one or more conditions emulated by the test code that caused the consumption of the at least one resource to exceed the threshold; and
determining a modification to the application to reduce the consumption of the at least one resource by the application during the one or more conditions.

11. The one or more computer-readable storage media as recited in claim 9, the plurality of resources including at least one of a memory associated with a user device, a number of execution cycles of at least one of the one or more processors, a transmission bandwidth, or a receiving bandwidth.

12. The one or more computer-readable storage media as recited in claim 9, wherein perturbing the environment of the application comprises reducing an execution speed of the application.

13. The one or more computer-readable storage media as recited in claim 9, wherein perturbing the environment of the application comprises reducing an amount of memory available to the application.

14. The one or more computer-readable storage media as recited in claim 9, wherein perturbing the environment of the application comprises increasing a latency of data being received by the application.

15. The one or more computer-readable storage media as recited in claim 9, wherein perturbing the environment of the application comprises dropping one or more data packets that are addressed to the application.

16. A user device comprising:
one or more processors; and
one or more computer-readable media storing instructions, the instructions executable by the one or more processors to perform acts comprising:
- performing one or more perturbations to an environment of an application executing on the user device without affecting other applications executing on the user device;
- tracing execution of the application while the perturbations are being performed;
- determining resources of the user device consumed by the application based on the tracing;
- correlating the resources consumed by the application with the one or more perturbations;
- determining, based on the correlating, that a performance of the application was degraded by at least one perturbation of the one or more perturbations.

17. The computing device as recited in claim 16, the acts further comprising:
in response to determining that the performance of the application was degraded, determining at least one perturbation of the one or more perturbations that caused the performance of the application to be degraded.

18. The computing device as recited in claim 16, wherein the resources of the user device consumed by the application include one or more of:
- a size of the one or more computer-readable storage media,
- an amount of execution cycles of at least one processor of the one or more processors,
- a number of packets sent by the user device, or
- a number of packets received by the user device.

19. The computing device as recited in claim 16, further comprising:
- performing additional perturbations to affect an environment of a second application executing on the user device;
- tracing execution of the second application while the additional perturbations are being performed;
- determining the resources of the user device consumed by the second application; and
- determining that the performance of the second application was degraded by at least one of the additional perturbations.

20. The computing device as recited in claim 19, wherein the perturbations to affect the environment of the application are performed substantially contemporaneously with the additional perturbations to affect the environment of the second application.

* * * * *